US006939918B2

(12) United States Patent
Ellul et al.

(10) Patent No.: US 6,939,918 B2
(45) Date of Patent: Sep. 6, 2005

(54) THERMOPLASTIC ELASTOMERS HAVING IMPROVED LOW TEMPERATURE PROPERTIES

(75) Inventors: Maria D. Ellul, Silver Lake Village, OH (US); Sudhin Datta, Houston, TX (US); Jianya Cheng, Fairlawn, OH (US); Paul McDaniel, Cuyahoga Falls, OH (US); Kang-Bo Wang, Copley, OH (US)

(73) Assignee: Advanced Elastomer Systems L.P., Akron, OH (US)

( * ) Notice: Subject to any disclaimer, the term of this patent is extended or adjusted under 35 U.S.C. 154(b) by 0 days.

(21) Appl. No.: 10/204,241

(22) PCT Filed: Mar. 23, 2001

(86) PCT No.: PCT/US01/09435

§ 371 (c)(1),
(2), (4) Date: Aug. 19, 2002

(87) PCT Pub. No.: WO01/72894

PCT Pub. Date: Oct. 4, 2001

(65) Prior Publication Data

US 2003/0125454 A1 Jul. 3, 2003

Related U.S. Application Data

(60) Provisional application No. 60/192,106, filed on Mar. 24, 2000.

(51) Int. Cl.[7] .................................................. C08L 9/00
(52) U.S. Cl. ....................... 525/191; 525/237; 525/240; 525/242; 525/194; 525/88
(58) Field of Search .................................. 525/194, 240, 525/88, 237, 242, 191

(56) References Cited

U.S. PATENT DOCUMENTS 4,130,535 A * 12/1978 Coran et al. ................ 260/33.6
4,843,129 A * 6/1989 Spenadel et al. ............ 525/240
4,985,502 A * 1/1991 Izumi et al. ................. 525/194

FOREIGN PATENT DOCUMENTS

WO    WO 97 36741    * 10/1997

* cited by examiner

Primary Examiner—Ling-Sui Choi
(74) Attorney, Agent, or Firm—William G. Muller

(57) ABSTRACT

The present invention provides a thermoplastic vulcanizate prepared by a process comprising the steps of dynamically vulcanizing rubber within a blend that includes the rubber and a thermoplastic resin, where the rubber comprises an elastomeric copolymer of ethylene, at least one α-olefin, and optionally one or more diene monomers, where the elastomeric copolymer is characterized by having a crystallinity, as measured by differential scanning calorimetry, of less than 10 J/g, an ethylene content that is less than 90 mole percent based upon the entire copolymer, a weight average molecular weight that is greater than about 20,000 as measured by GPC with polystyrene standards, a molecular weight distribution that is less than 7, and an ethylene compositional distribution that is less than about 4 percent for the closest 90 percent of fractioned samples.

13 Claims, No Drawings

THERMOPLASTIC ELASTOMERS HAVING IMPROVED LOW TEMPERATURE PROPERTIES

This application gains priority from U.S. patent application Ser. No. 60/192,106, filed Mar. 24, 2000.

TECHNICAL FIELD

This invention is directed toward thermoplastic elastomers having improved low temperature properties.

BACKGROUND OF THE INVENTION

Thermoplastic elastomers, which may be referred to as thermoplastic vulcanizates, are well known. They have many of the properties of elastomers, yet they are processable as thermoplastics. Thermoplastic vulcanizates are conventionally produced by dynamic vulcanization, which is a process whereby a rubber is cured or vulcanized within a blend with at least one non-vulcanizing polymer while the polymers are undergoing mixing or masticating at some elevated temperature, preferably above the melt temperature of the non-vulcanizing polymer.

For example, U.S. Pat. No. 4,130,535 discloses a thermoplastic vulcanizate comprising blends of a polyolefin resin and completely cured olefin copolymer rubber. The olefin copolymer rubber may include EPDM rubber, which is generally formed by the polymerization of monomers comprising two olefins, generally ethylene and propylene, and a lesser quantity of a non-conjugated diene monomer such as 5-ethylidene-2-norbornene. The thermoplastic matrix, however, tends to decrease resistance to compression set at lower temperatures. Some attempts have been made to improve this resistance to compression set. For example, various rubber processing oils have been added.

Because the low temperature performance of thermoplastic vulcanizates is important, there is a need in the art to improve their low temperature properties.

SUMMARY OF INVENTION

The present invention provides a thermoplastic vulcanizate prepared by a process comprising the steps of dynamically vulcanizing rubber within a blend that includes the rubber and a thermoplastic resin, where the rubber comprises an elastomeric copolymer of ethylene, at least one α-olefin, and optionally one or more diene monomers, where the elastomeric copolymer is characterized by having a crystallinity, as measured by differential scanning calorimetry, of less than 10 J/g, an ethylene content that is less than 90 mole percent based upon the entire copolymer, a weight average molecular weight that is greater than about 20,000 as measured by GPC with polystyrene standards, a molecular weight distribution that is less than 7, and an ethylene compositional distribution that is less than about 4 percent for the closest 90 percent of fractioned samples.

The present invention also includes a thermoplastic vulcanizate comprising a blend of cured rubber and thermoplastic resin, where the rubber comprises an elastomeric copolymer of ethylene, at least one α-olefin, and optionally one or more diene monomers, where the elastomeric copolymer is characterized by having a crystallinity, as measured by differential scanning calorimetry, of less than 10 J/g, an ethylene content that is less than 90 mole percent based upon the entire copolymer, a weight average molecular weight that is greater than about 20,000 as measured by GPC with polystyrene standards, a molecular weight distribution that is less than 7, and an ethylene compositional distribution that is less than about 4 percent for the closest 90 percent of fractioned samples.

The thermoplastic elastomers of the present invention advantageously exhibit improved elasticity and resistance to set at lower temperatures as compared to those thermoplastic vulcanizates that exclusively employ conventional olefin copolymer rubbers such as EPDM. This advantage is exemplified by the improvement in compression set and compression recovery. Surprisingly, this result has been achieved without a deleterious reduction in the mechanical properties of the thermoplastic vulcanizate. It has been found that the low temperature properties, especially the low temperature compression set and recovery, are influenced to a great extent by both the ethylene content and its distribution, even in the amorphous region. Also, these results have been achieved without deleteriously impacting the hardness of the thermoplastic vulcanizate at room temperature.

PREFERRED EMBODIMENT FOR CARRYING OUT THE INVENTION

The thermoplastic elastomers of this invention include blends of rubber that is at least partially cured and thermoplastic resin. The rubber includes a unique elastomeric copolymer that is obtained from the polymerization of ethylene, α-olefin, and optionally diene monomer, and is characterized by having essentially no crystallinity, a relatively high molecular weight, a relatively low ethylene content, and a relatively narrow ethylene compositional distribution.

The unique elastomeric copolymer contains monomeric units that derive from ethylene monomer, at least one α-olefin monomer, and optionally one or more diene monomers. The α-olefins may include, but are not limited to, propylene, butene-1, hexene-1, 4-methyl-1 pentene, octene-1, decene-1, or combinations thereof. The preferred α-olefins are propylene, hexene-1, octene-1 or combinations thereof. The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene and the like, or a combination thereof. The preferred diene monomers are 5-ethylidene-2-norbornene, divinyl benzene, and 5-vinyl-2-norbornene. In the event that copolymer is prepared from ethylene, α-olefin, and diene monomers, the copolymer may be referred to as a terpolymer or even a tetrapolymer in the event that multiple α-olefins or dienes are used.

These elastomeric copolymers contain from about 20 to about 90 mole percent ethylene units deriving from ethylene monomer. Preferably, these copolymers contain from about 30 to about 70 mole percent, and even more preferably from about 40 to about 60 mole percent, ethylene units. Furthermore, where the copolymers contain diene units, the diene units can be present in an amount from about 0.1 to about 5 mole percent, preferably from about 0.2 to about 4 mole percent, and even more preferably from about 1 to about 2.5 mole percent. The balance of the copolymer will generally be made up of units deriving from α-olefin monomers. Accordingly, the copolymer may contain from about 10 to about 50 mole percent, preferably from about 30 to about 50 mole percent, and more preferably from about 40 to about 60 mole percent, α-olefin units deriving from α-olefin monomers. The foregoing mole percentages are based upon the total moles of the polymer.

The relatively low ethylene content of these elastomeric polymers employed in this invention is believed to be at least partially responsible for the improved low temperature properties of the thermoplastic vulcanizates of this invention. As mentioned above, this ethylene content should generally be less than 90 mole percent, preferably less than 70 mole percent, more preferably less than 60 mole percent, and even more preferably less than 50 mole percent, based upon the mole percent of the entire polymer.

Surprisingly, the improvement in low temperature properties increases as the ethylene content decreases, even within the amorphous region. This result is surprising because conventional wisdom suggests that the glass transition temperature controls the low temperature properties of the polymer. The glass transition temperature, of course, is a function of the crystallinity, which in turn is a function of the ethylene content. Since the change in glass transition temperature of the copolymers is negligible as the ethylene levels are lowered below 60 mole percent, i.e., the polymers are amorphous, no benefit was believed to be gained by only lowering the ethylene content within the amorphous region, i.e. below 60 mole percent.

Furthermore, it has been found that the ethylene content of these copolymers does not alone control the low temperature properties of the polymer. Rather, it is believed that the low temperature properties of the polymer are influenced by both the ethylene content and the ethylene compositional distribution, even in the amorphous region.

Also, the compositional distribution of these elastomeric polymers of this invention, as based upon the closest 90 percent of fractionated samples of a given polymer, should not vary by more than 4 percent, preferably by not more than 3 percent, more preferably by not more than 2 percent, and most preferably by not more than 1 percent. In other words, when fractions of a polymer sample are analyzed, the amount of ethylene within each fraction should not vary by more than 4 percent—or as the preferred range may be—for the closest 90 percent of the fractionated samples.

Analytically, the ethylene compositional distribution of a polymer sample may be determined by the following exemplary method. Five grams of a polymer is dissolved within 500 ml of hexane or cyclohexane at room temperature. The insoluble portion is filtered out and dried by pouring the entire solution through a 150 mesh stainless steel screen. To the soluble portion, i.e., supernatant solution, is added 2-propanol dropwise until the solution becomes turbid. Approximately, one more ml of 2-propanol is added dropwise and the solution is allowed to stand for five minutes. The entire solution is filtered through a 150 mesh stainless steel screen and the residue is separated and dried. If further fractionation is desired, the above process is repeated to generate additional fractions—normally up to 5 or 6—until most of the polymer is precipitated. The insoluble portion and the residues are analyzed by FTIR for composition (ethylene and diene) and compared to the composition of the bulk sample. Similar procedures are described in WO 00/22014 and 00/22015, both of which are incorporated herein by reference.

Still further, these elastomeric copolymers should have essentially no crystallinity, which means that the copolymers have less crystallinity, as measured by differential scanning calorimetry, than similar copolymers employed in the prior art. Generally, these copolymers will have a crystallinity that is less than about 10 J/g, preferably less than about 3 J/g, more preferably less than about 1.5 J/g, even more preferably less than about 0.5 J/g, still more preferably less than 0.2 J/g, and most preferably less than 0.1 J/g. Analytically, the crystallinity referred to in this specification was determined by the following method. About 6 to about 12 mg of a sheet of the polymer pressed at approximately 200° C. to about 230° C. is removed with a punched dye, and then annealed at room temperature for about 240 hours. At the end of this period, the sample is placed in a differential scanning calorimeter (Perkin Elmer 7 Series Thermal Analysis System) and cooled to about −50° C. to about −70° C. The sample is heated at 20° C./min to attain a final temperature of about 200° C. to about 220° C. The thermal output is recorded as the area under the melting peak of the sample, which is typically peaked at about 30° C. to about 175° C. and occurs between the temperatures of about 0° C. to about 200° C., and measured in Joules as a measure of the heat of fusion. The melting point is recorded as the temperature of the greatest heat absorption within the range of melting of the sample.

In addition to the low crystallinity, these elastomeric copolymers should likewise have a relatively high molecular weight. It is believed that many of the advantageous mechanical properties exhibited by the thermoplastic vulcanizates of this invention result from the relatively high molecular weight of these elastomeric copolymers. Specifically, the elastomeric copolymers should generally have a weight average molecular weight, as measured by GPC with polystyrene standards, of from about 20,000 to about 1,000,000, preferably from about 40,000 to about 800,000, more preferably from about 100,000 to about 700,000, and most preferably from about 200,000 to about 600,000. The molecular weight distribution of these copolymers should generally be less than about 7, preferably less than about 5, and more preferably less than about 4.

Still further, these elastomeric copolymers preferably have a Mooney Viscosity (ML$_{1+4}$ @ 125° C.) of about 5 to about 500, preferably about 35 to about 200, more preferably about 50 to about 150, even more preferably from about 70 to about 100, and still more preferably greater than 80 to about 90.

These elastomeric copolymers may be prepared by using a variety of techniques including Ziegler-Natta or metallocene catalysis. Also, a variety of reactor schemes may be used in conjunction with these catalyst systems.

For example, Ziegler-Natta polymerization may be carried out with VCl$_4$ or VOCl$_3$ as the catalyst and ethyl aluminum sesquichloride as the co-catalyst. These catalyst systems exhibit kinetics typical of a single active species. A modifier such as an amine or ammonia can be used to introduce the desired level of long chain branching in the polymer chain. Generally this catalyst system will produce a narrow composition distribution and a narrow molecular weight distribution, but these may be broadened by utilizing reactor schemes. Those skilled in the art will appreciate that increased molecular weight polymers can be made by lowering both the amount of catalyst as well as the amount of the chain transfer agent employed during polymerization.

When these vanadium-based catalyst systems are employed, the polymerization is preferably carried out in the presence of a solvent, such as hexane, at a temperature of about 20° C. to about 65° C., and a residence time of about 6 to about 15 minutes at a pressure of about 7 kg/cm2. The concentration of vanadium to alkyl is from about 1:4 to about 1:10. About 0.2 to about 1.5 kg of polymer is produced per gram of catalyst fed to the reactor. The polymer concentration in the hexane solvent is from about 3 to about 8 percent by weight. For a further discussion of this polymerization method, reference can be made to the reaction of Vanadium Tetrachloride . . . in MACROMOLECULES by Datta et al., V 35, p. 6430 (1992).

Metallocene catalysts may also be used. Conventionally, active catalysts are formed with bis (cyclopentadienyl) compounds of Group IV-B metals, including zirconium, hafnium, or titanium, that have been activated with alumoxane, ionizing non-coordinating anion precursors, or alkyl aluminum compounds. For a further discussion of this catalysis, reference can be made to U.S. Pat. No. 5,096,867, which is incorporated herein by reference.

In addition to conventional metallocene catalysis, ionic-metallocene catalysis may be used to prepare the elastomeric polymers. In general, these catalytic species are formed by combining a bis(cyclopentadienyl) derivative of a Group IV-B metal compound containing at least one ligand that will combine with the a second component that is an ion-exchange compound. The second compound, i.e.,the ion-exchange compound, comprises a cation that will irreversibly react with at least one ligand contained in the Group IV-B metal compound and a non-coordinating anion that is bulky, labile, and stable. This ionic-metallocene catalyst can be used without an alumoxane activator and therefore is more cost effective. For a further discussion of this catalysis, reference can be made to U.S. Pat. Nos. 5,198,401, 5,241,025, and 5,387,568, EP Application Nos. 277,003 and 277,004, and WIPO Publication Nos. 91/09882, 92/00333, 93/11172, 94/03506, and 99/04553, all of which are incorporated herein by reference. One particular method for making the unique copolymers employed in this invention is described in WIPO Publication Nos. 00/22014 and 00/22015, which are incorporated herein by reference. Those skilled in the art will appreciate, however, that the unique elastomeric copolymers employed in this invention have a higher molecular weight and therefore lower catalyst loadings should be used.

In addition to the unique elastomeric copolymers and thermoplastic resin, the thermoplastic vulcanizates of this invention may, optionally, also include conventional rubbers. These conventional rubbers may include conventional elastomeric copolymers such as terpolymers of ethylene, propylene, and 5-ethylidene-2-norbornene, butyl rubber, natural rubber, and the like. These rubbers are fully described in U.S. Ser. Nos. 09/752,080 and 09/771,044, which are incorporated herein by reference for this purpose.

Useful thermoplastic resins include solid, generally high molecular weight plastic materials. Preferably, these resins are crystalline or semi-crystalline polymers that have a crystallinity of at least 25 percent as measured by differential scanning calorimetry. Polymers with a high glass transition temperature are also acceptable as the thermoplastic resin. These resins also preferably have a melt temperature or glass transition temperature in the range from about 80° C. to about 350° C., but the melt temperature should generally be lower than the decomposition temperature of the thermoplastic elastomer.

Exemplary thermoplastic resins include crystallizable polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics. The preferred thermoplastic resins are crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Preferred copolymers include propylene-ethylene copolymers that include minor amounts of ethylene such as disclosed in EP 0 969 043 A1, which is incorporated herein by reference. These copolymers may be produced by either metallocene catalysis or Ziegler Natta catalysis. Others include copolymers of styrene and ethylene, such as those available under the tradename INDEX™ (Dow Chemical; Midland, Mich.). Still others include long-chain branched thermoplastic resins such as those described in co-pending U.S. Ser. No. 09/771,044, which is incorporated herein by reference. These copolymers, as with the homopolymers, may be used in the neat, i.e., as the sole thermoplastic resin, or as a blend with other thermoplastic resins. Useful thermoplastic homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

An especially preferred thermoplastic polyolefin is high-crystalline isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 1.0 dg/min per ASTM D-1238.

Any curative that is capable of curing or crosslinking the elastomeric copolymers employed in this invention may be used in practicing this invention. Some non-limiting examples of these curatives include phenolic resins, peroxides, maleimides, and silicon-based curatives.

Any phenolic resin that is capable of crosslinking a rubber polymer can be employed in practicing the present invention. U.S. Pat. Nos. 2,972,600 and 3,287,440 are incorporated herein in this regard. The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms are preferred. These phenolic curatives are typically thermosetting resins and may be referred to as phenolic resin curatives or phenolic resins for purposes of this disclosure. curatives. These phenolic resins are ideally used in conjunction with a catalyst system. For example, non-halogenated phenol curing resins are preferably used in conjunction with halogen donors and, optionally, a hydrogen halide scavenger. Where the phenol curing resin is halogenated, a halogen donor is not required but the use of a hydrogen halide scavenger is preferred. For a further discussion of phenolic resin curing of thermoplastic vulcanizates, reference can be made to U.S. Pat. No. 4,311,628, which is incorporated herein by reference.

An example of a preferred phenolic resin curative is defined according to the general formula (I).

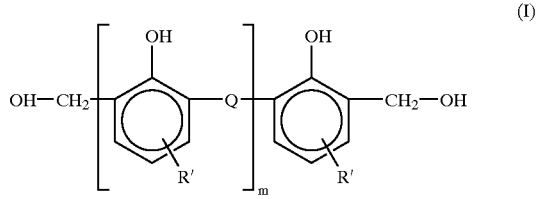

where Q is a divalent radical selected from the group consisting of —CH$_2$—, —CH$_2$—O—CH$_2$—; m is zero or a positive integer from 1 to 20 and R' is an organic radical. Preferably, Q is the divalent radical —CH$_2$—O—CH$_2$—, m is zero or a positive integer from 1 to 10, and R' is an organic radical having less than 20 carbon atoms. Still more preferably m is zero or a positive integer from 1 to 5 and R' is an organic radical having between 4 and 12 carbon atoms.

Peroxide curatives are generally selected from organic peroxides. Examples or organic peroxides include, but are not limited to, di-tert-butyl peroxide, dicumyl peroxide, t-butylcumyl peroxide, α,α-bis(tert-butylperoxy) diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy) valerate, benzoyl peroxide, lauroyl peroxide, dilauroyl peroxide, 2,5-dimethyl-2,5-di(tert-butylperoxy) hexene-3, and mixtures thereof. Also, diaryl peroxides, ketone peroxides, peroxydicarbonates, peroxyesters, dialkyl peroxides, hydroperoxides, peroxyketals and mixtures thereof may be used. For a further discussion of peroxide curatives and their use for preparing thermoplastic vulcanizates, reference can be made to U.S. Pat. No. 5,656,693, which is incorporated herein by reference.

Useful silicon-containing curatives generally include silicon hydride compounds having at least two SiH groups. These compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethylsiloxane copolymers, alkyl methyl polysiloxanes, bis(dimethylsilyl)alkanes, bis(dimethylsilyl)benzene, and mixtures thereof.

Preferred silicon hydride compounds may be defined by the formula

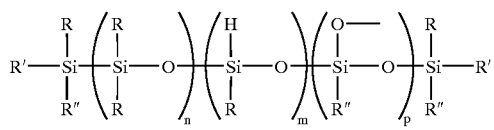

where each R is independently selected from alkyls containing 1 to 20 carbon atoms, cycloalkyls containing 4 to 12 carbon atoms, and aryls, m is an integer having a value ranging form 1 to about 50, n is an integer having a value ranging from 1 to about 50, and p is an integer having a value ranging from 0 to about 6.

As noted above, hydrosilation curing of the elastomeric polymer is preferably conducted in the presence of a catalyst. These catalysts can include, but are not limited to, catalysts including transition metals of Group VIII. These metals include, but are not limited to, palladium, rhodium, and platinum, as well as complexes of these metals. Platinum catalyst are preferred. For a further discussion of the use of hydrosilation to cure thermoplastic vulcanizates, reference can be made to U.S. Pat. No. 5,936,028, which is incorporated herein by reference. When silicon-containing curatives are employed, the elastomeric copolymer employed will preferably include 5-vinyl-2-norbornene as the diene component.

Preferably, plasticizers, extender oils, synthetic processing oils, or combination thereof may be employed in the compositions of the present invention. The extender oils may include, but are not limited to aromatic, naphthenic, and paraffinic extender oils. The preferred synthetic processing oils are polylinear (α-olefins. Even more preferably, the compositions of this invention may include organic esters, alkyl ethers, or combinations thereof. U.S. Pat. Nos. 5,290,886 and 5,397,823 are incorporated herein in this regard. The addition of certain low to medium molecular weight organic esters and alkyl ether esters to the compositions of the invention dramatically lowers the $T_g$ of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. It is important that the ester be compatible, or miscible, with both the polyolefin and rubber components of the composition; i.e. that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective.

Esters may be screened for suitability by a simple test of their ability to swell in polyolefin such as polypropylene. For the purposes of this invention, polypropylene samples (2.0× 20×50 mm) were immersed in various ester plasticizers or non-ester diluents such as mineral oils, and were swollen at 125° C. to constant weight (normally about 24 hours). If the total change in weight was greater than 40%, the diluent was considered significantly compatible with the polypropylene and therefore suitable for preparing compositions with enhanced low temperature performance.

Examples of ester that have been found satisfactory for use in the present invention include isooctyltallate, isooctyloleate, n-butyltallate, -butyloleate, butoxyethyloleate, dioctylsebacate, di 2-ethylhexylsebacate, dioctylazelate, diisooctyldodecanedioate, alkylalkylether diester glutarate and oligomers thereof. Other analogues expected to be useful in the present invention include alkyl alkylether mono- and di-adipates, mono- and dialkyl adipates, glutarates, sebacates, azelates, ester deriviatives of castor oil or tall oil and oligomeric mono- and diesters or mono- and dialkyl ether esters therefrom, such as tall oil fatty acid esters; e.g., n-decyl tallate, isodecyl tallate, undecyl tallate, dodecyl tallate, tridecyl tallate, and higher derivatives of tall oil fatty acids and aliphatic alcohols. Isooctyltallate and n-butyltallate are particularly preferred. These esters may be used alone in the compositions, or as mixtures of different esters, or they may be used in combination with conventional hydrocarbon oil diluents or process oils, e.g. paraffin oil.

The type of processing or extender oil will be that ordinarily used in conjunction with the specific rubber or rubbers present in the composition, and the quantity based on the total rubber content may range from zero to a few hundred phr. It is an important aspect of the present invention, however, that processing oil need not be present, and in fact it may be totally replaced by the ester plasticizer component of the composition. In other words, depending upon the properties desired in the thermoplastic elastomers of the invention, the composition may be free of processing oil or it may contain a combination of processing oil and ester.

In addition to the thermoplastic, rubber, and optional extender oils and the like, the compositions of the invention include curatives and may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Preferably, compositions of this invention will contain a sufficient amount of rubber, such as the unique elastomeric copolymer, to form rubbery compositions of matter. Rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the compositions of the present invention should comprise at least about 25 percent by weight rubber. The rubber may exclusively include the unique elastomeric copolymers described herein or a combination of these elastomeric copolymers and conventional rubbers. More specifically, the thermoplastic vulcanizates include from about 15 to about 90 percent by weight, preferably from about 45 to about 85 percent by weight, and more preferably from about 60 to about 80 percent by weight rubber, based on the total weight of the rubber and the thermoplastic combined.

Where the rubber component includes a conventional rubber, the rubber component should include at least 50 weight percent, preferably at least 70 weight percent, more preferably at least 90 weight percent, and most preferably at least 95 weight percent of the unique elastomeric copolymer.

The amount of thermoplastic within the thermoplastic vulcanizates is generally from about 10 to about 85 percent by weight, preferably from about 15 to about 55 percent by weight, and more preferably from about 20 to about 40 percent by weight of the total weight of the rubber and the thermoplastic combined.

The skilled artisan will be able to readily determine a sufficient or effective amount of vulcanizing agent to be employed without undue calculation or experimentation. The amount of vulcanizing agent should be sufficient to at least partially vulcanize the rubber. Preferably, the rubber is completely vulcanized.

Where a phenolic resin curative is employed, a vulcanizing amount of curative preferably comprises from about 1 to about 20 parts by weight, more preferably from about 3 to about 16 parts by weight, and even more preferably from about 4 to about 12 parts by weight, phenolic resin per 100 parts by weight rubber.

Where a peroxide curative is employed, a vulcanizing amount of peroxide preferably comprises from about $1 \times 10^{-4}$ moles to about $2 \times 10^{-2}$ moles, more preferably from about $2 \times 10^{-4}$ moles to about $2 \times 10^{-3}$ moles, and even more preferably from about $7 \times 10^{-4}$ to about $1.5 \times 10^{-3}$ per hundred parts by weight rubber.

Where a silicon-containing curative is employed, a vulcanizing amount of curative preferably comprises from 0.1 to about 10 mole equivalents, and preferably from about 0.5 to about 5 mole equivalents, of SiH per carbon-carbon double bond.

Generally, from about 5 to about 300 parts by weight, preferably from about 30 to about 250 parts by weight, and more preferably from about 70 to about 200 parts by weight, of extender oil per 100 parts rubber is added. The quantity of extender oil added depends upon the properties desired, with the upper limit depending upon the compatibility of the particular oil and blend ingredients; this limit is exceeded when excessive exuding of extender oil occurs. The amount of ester plasticizer in the composition will generally be less than about 250 parts, and preferably less than about 175 parts, per parts elastomeric copolymer.

Carbon black may be added in amount from about 40 to about 250 parts, and more preferably from about 20 to about 100 parts by weight per 100 parts total weight of rubber and thermoplastic. The amount of carbon black that can be used depends, at least in part, upon the type of carbon black and the amount of extender oil that is used. The amount of extender oil depends, at least in part, upon the type of rubber. High viscosity rubbers are more highly oil extendable.

Preferably, the rubber is crosslinked by dynamic vulcanization. The term dynamic vulcanization refers to a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and is usually dispersed as fine particles within the polyolefin matrix, although other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. One method for preparing thermoplastic vulcanizates is described in U.S. Pat. No. 4,594,390, which is incorporated herein by reference.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired.

Despite the fact that the rubber component is partially or fully cured, the compositions of this invention can be processed and reprocessed by conventional plastic processing techniques such as extrusion, injection molding, and compression molding. The rubber within the thermoplastic elastomers of this invention is usually in the form of finely-divided and well-dispersed particles of vulcanized or cured rubber, although a co-continuous morphology or a phase inversion is also possible.

The term vulcanized or cured rubber refers to an elastomeric polymer that has undergone at least a partial cure. The degree of cure can be measured by determining the amount gel, or conversely, the rubber that is extractable from the thermoplastic elastomer by using boiling xylene or cyclohexane as an extractant. This method is disclosed in U.S. Pat. No. 4,311,628. By using this method as a basis, the cured rubber of this invention will have a degree of cure where not more than 35 percent of the rubber is extractable, preferably not more than 15 percent, even more preferably not more than 10 percent, and still more preferably not more than 5 percent of the rubber is extractable. Alternatively, the degree of cure may be expressed in terms of crosslink density. Preferably, the crosslink density is from about 40 to about 160 moles per milliliter of rubber. All of these descriptions are well known in the art and described in U.S. Pat Nos. 5,100,947 and 5,157,081, which are incorporated herein by reference.

The thermoplastic vulcanizates of this invention are useful for making a variety of articles such as weather seals, hoses, belts, gaskets, moldings, boots, elastic fibers and like articles. They are particularly useful for making articles by blow molding, extrusion, injection molding, thermoforming, elasto-welding and compression molding techniques. More specifically, the articles of the invention are particularly useful for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal, plastic combination materials which will be known to those of ordinary skill in the art. Also contemplated are transmission belts including V-belts, toothed belts with truncated ribs containing fabric faced V's, ground short fiber reinforced V's or molded gum with short fiber flocked V's. The cross section of such belts and their number of ribs may vary with the final use of the belt, the type of market and the power to transmit. They also can be flat made of textile fabric reinforcement with frictioned outside faces. Vehicles contemplated where these parts will find application include, but are not limited to passenger autos, motorcycles, trucks, boats and other vehicular conveyances.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

Samples 1–6

Thermoplastic vulcanizates were prepared by using the five elastomeric copolymers characterized in Table I. These elastomeric copolymers are terpolymers of ethylene, propylene, and 5-ethylidene-2-norbornene (EPDM). EPDM I represents elastomeric copolymers conventionally used in making thermoplastic vulcanizates. EPDM II–V represent the unique elastomeric copolymers described herein. The molecular weight of the polymers was determined according to Gel Permeation Chromatography (GPC), as well as low angle light scattering (LALLS). Crystallinity was determined as previously described.

TABLE I

|  | EPDM I | EPDM II | EPDM III | EPDM IV | EPDM V |
|---|---|---|---|---|---|
| Mooney Viscosity ($ML_{1+4}$ @ 125° C.) | 91.0 | 77.0 | 68.8 | 87 | 58.6 |
| Ethylene Content (wt %) | 55.5 | 50.7 | 44.6 | 50.5 | 51.7 |
| Ethylidene Norbornene Content (wt %) | 5.7 | 5.8 | 5.8 | 5.7 | 5.1 |
| Molecular Weight (GPC) | | | | | |
| $M_n$ | 81,900 | 102,500 | 112,100 | 92,200 | 99,100 |
| $M_w$ | 288,000 | 265,100 | 241,900 | 291,700 | 307,900 |
| $M_z$ | 1,886,000 | 780,900 | 568,200 | 891,500 | 931,900 |
| Molecular Weight (LALLS) | | | | | |
| $M_n$ | 118,100 | 155,400 | 133,400 | 172,100 | 177,300 |
| $M_w$ | 380,000 | 353,800 | 286,100 | 392,100 | 397,300 |
| $M_z$ | 2,916,000 | 1,122,000 | 783,900 | 1,154,000 | 1,190,000 |
| $M_w/M_n$ | 4.7 | 3.5 | 2.6 | 4.3 | 4.0 |
| DSC | | | | | |
| ΔH (J/g) | 1.4 | None | None | 1.2 | 1.1 |
| ΔCp (J/g ° C.) | 0.5 | 0.6 | 0.6 | 0.6 | 0.5 |
| Tg (° C.) | −50.3 | −53.9 | −50.6 | −48.3 | −50.3 |

Table II provides the recipes for the thermoplastic elastomers designated Samples 1–6. The amount of each ingredient within each table is in parts by weight. EPDM I was obtained under the tradename Vistalon™ 7500 (Exxon Chemical; Baytown, Tex.). EPDM II–V were prepared by using the synthetic procedure set forth in WO 00/22014 and 00/22015, except that lower catalyst loadings were employed. It is noted that Vistalon™ 7500 has many of the characteristics of other elastomeric copolymers available in the prior art such as Vistalon™ 8600 (Exxon). The phenolic resin was obtained under the tradename SP-1045™ (Schenectady International; Schenectady, N.Y.). The powdered blend included zinc oxide and stannous chloride. The ester plasticizer was a tridecyl tallate. The carbon black/polypropylene was a commercially available concentrate.

TABLE II

|  | Sample | | | | | |
|---|---|---|---|---|---|---|
|  | 1 | 2 | 3 | 4 | 5 | 6 |
| EPDM I | 100 | — | — | 100 | — | — |
| EPDM II | — | 100 | — | — | 100 | — |
| EPDM III | — | — | 100 | — | — | 100 |
| Clay | 5 | 5 | 5 | 10 | 10 | 10 |
| Powder Blend | 3.26 | 3.26 | 3.26 | 3.26 | 3.26 | 3.26 |
| Phenolic Resin | 7 | 7 | 7 | 6 | 6 | 6 |
| Ester Plasticizer | 107 | 107 | 107 | 130 | 130 | 130 |
| Polypropylene | 219.2 | 219.2 | 219.2 | 50 | 50 | 50 |
| Carbon Black/Polypropylene | 19.28 | 19.28 | 19.28 | 10 | 10 | 10 |

Procedurally, the thermoplastic resin and rubber were placed in a heated extruder with an appropriate portion of the other desired additives. The mixture was heated to a temperature sufficient to melt the polyolefin component, the mixture was masticated, and curative was added while mastication continued. After a maximum torque indicated that vulcanization had occurred, mixing was continued until the desired degree of vulcanization was achieved. The compositions were then removed from the mixer, molded and tested for their physical properties.

Shore A and D hardness were determined pursuant to ASTM D-2240-91 at 23° C. by using a durometer. Ultimate tensile strength, ultimate elongation, and 100 percent modulus were determined according to ASTM D-412-92 at 23° C. by using an Instron Testing Machine. Weight gain was determined according to ASTM D-471 after 24 hours at 125° C. Tension set was determined according to ASTM D-142. Compression Set and Recovery were determined according to ASTM D-3542 for those tests run at −29° C. Compression Set and Recovery were determined according to ASTM D-395-B for those tests run at 70° C. and 100° C. Compression set and compression recovery tests were run for 24 hours at temperatures below room temperature and for 22 hours at room temperature and above. Notched Izod was determined according to ASTM D-256 at −40° C. Extrusion surface roughness was measured as described in *Chemical Surface Treatments of Natural Rubber And EPDM Thermoplastic Elastomers: Effects on Friction and Adhesion*, RUBBER CHEMISTRY AND TECHNOLOGY, Vol. 67, No. 4 (1994). ACR viscosity, which is a measure of the shear viscosity of a thermoplastic vulcanizate at a fixed shear, was measured by using an automated capillary rheometer that was equipped with a number AX150 33/1 L/D ratio, 0.031 diameter orifice, at 204° C. and 118 kPa.

Table III provides the results of the analyses that were performed on the respective samples. Table IV provides similar data that resulted from tests that were performed on the respective samples after they were aged for about three months at room temperature.

TABLE III

| | Sample | | | | | |
|---|---|---|---|---|---|---|
| | 1 | 2 | 3 | 4 | 5 | 6 |
| Hardness, Shore D/A | 40D | 40D | 41D | 66A | 66A | 64A |
| Specific Gravity | 0.909 | 0.911 | 0.911 | 0.912 | 0.913 | 0.914 |
| Ultimate Tensile Strength (MPa) | 15.74 | 15.46 | 18.54 | 4.82 | 4.92 | 5.03 |
| Ultimate Elongation (%) | 583 | 557 | 597 | 307 | 298 | 279 |
| Modulus at 100% (MPa) | 8.30 | 8.22 | 8.18 | 2.21 | 2.22 | 2.28 |
| % Wt. Gain (24 h @ 125° C.) | 59 | 63 | 58 | 117 | 109 | 98 |
| Viscosity ACR (Poise) | 1895 | 2169 | 2771 | 782 | 547 | 1050 |
| Extrusion Surface Rating | 39 | 53 | 87 | 342 | 268 | 344 |
| % Tension Set @ 23° C. | 45 | 44 | 41 | 12 | 10.5 | 10 |
| Notched Izod (J/m @ −40° C.) | 820 | 773 | 769 | — | — | — |
| % Compression set, 50% Compression Strain @ −29° C. | — | — | — | 43 | 30 | 21 |
| % Recovery, 50% Compression Strain @ −29° C. | — | — | — | 78 | 85 | 90 |

TABLE IV

| | Sample | | | | | |
|---|---|---|---|---|---|---|
| | 1 | 2 | 3 | 4 | 5 | 6 |
| Hardness, Shore D/A | 39D | 37D | 38D | 66A | 64A | 64A |
| Specific Gravity | 0.918 | 0.91 | 0.909 | 0.915 | 0.911 | 0.91 |
| Ultimate Tensile Strength (MPa) | 17.06 | 16.34 | 18.29 | 5.35 | 5.40 | 5.28 |
| Ultimate Elongation (%) | 607 | 616 | 607 | 355 | 329 | 299 |
| Modulus at 100% elongation (MPa) | 9.35 | 9.09 | 9.32 | 2.45 | 2.42 | 2.47 |
| % Wt. Gain (24 h @ 125° C.) | 57 | 58 | 50 | 110 | 108 | 97 |
| % Tension Set @ 23° C. | 42.5 | 41.5 | 39.5 | 11.5 | 9.5 | 8.5 |
| % Compression Set, 25% Strain @ 70° C. | 61 | 61 | 59 | 32 | 27 | 25 |
| % Compression Set, 25% Strain @ 100° C. | 62 | 63 | 59 | 38 | 32 | 31 |
| % Compression set, 50% Strain @ −29° C. | — | — | — | 45 | 33 | 22 |
| % Recovery, 50% Strain @ −29° C. | — | — | — | 77 | 84 | 89 |

Samples 7–12

In a similar fashion to Samples 1–6, additional thermoplastic vulcanizates were prepared and designated Samples 7–12. The recipes for each sample are provided in Table V, and the results of testing are provided in Table VI.

TABLE V

| | Sample | | | | | |
|---|---|---|---|---|---|---|
| | 7 | 8 | 9 | 10 | 11 | 12 |
| EPDM I | 100 | 100 | — | — | — | — |
| EPDM II | — | — | 100 | 100 | — | — |
| EPDM III | — | — | — | — | 100 | 100 |
| Clay | 10 | 10 | 10 | 10 | 10 | 10 |
| ZnO | 2 | 2 | 2 | 2 | 2 | 2 |
| Stannous Chloride | 1.26 | 1.26 | 1.26 | 1.26 | 1.26 | 1.26 |
| Polypropylene | 50 | 50 | 50 | 50 | 50 | 50 |
| Carbon Black | 10 | 10 | 10 | 10 | 10 | 10 |
| Phenolic Resin | 6 | 6 | 6 | 6 | 6 | 6 |
| Aliphatic Ester Plasticizer | 130 | 130 | 130 | 130 | 130 | 130 |
| Total (PHR) | 309.26 | 309.26 | 309.26 | 309.26 | 309.26 | 309.26 |

TABLE VI

| | \multicolumn{6}{c}{Sample} |
| --- | --- | --- | --- | --- | --- | --- |
| | 7 | 8 | 9 | 10 | 11 | 12 |
| Moisture (%) | 0.028 | 0.038 | 0.039 | 0.024 | 0.036 | 0.035 |
| Shore A Hardness | 64 | 64 | 63 | 64 | 63 | 63 |
| Specific Gravity | 0.912 | 0.91 | 0.912 | 0.912 | 0.913 | 0.909 |
| Ultimate Tensile Strength (MPa) | 4.94 | 4.93 | 4.17 | 4.33 | 4.21 | 4.33 |
| Ultimate Elongation (%) | 284 | 289 | 242 | 269 | 258 | 251 |
| Modulus at 100% (MPa) | 2.17 | 2.19 | 2.17 | 2.10 | 2.03 | 2.14 |
| % Wt. Gain (24 h @ 125° C.) | 110 | 107 | 107 | 104 | 112 | 101 |
| Viscosity ACR (Poise) | 979 | 891 | 886 | 652 | 1030 | 746 |
| Extrusion Surface Rating | 336 | 355 | 425 | 368 | 421 | 312 |
| Tension Set @ 23° C. (%) | 10 | 10 | 10 | 10.5 | 10 | 9 |
| Notched Izod @ −40° C. J/m | | | | | | |
| Compression Recovery, 50% Strain @ −29° C. | 78 | 79 | 85 | 84 | 89 | 88 |
| Compression Set, 50% Strain @ −29° C. | 45 | 42 | 31 | 32 | 22 | 24 |
| Compression Set, 25% Strain @ 70° C. | 30 | 27 | 28 | 30 | 27 | 27 |
| Compression Set, 25% Strain @ 100° C. | 33 | 32 | 32 | 34 | 30 | 29 |

Samples 13–18

In a similar fashion to Samples 1–12, additional thermoplastic vulcanizates were prepared and designated Samples 13–18. The recipes for each sample are provided in Table VII, and the results of testing are provided in Table VIII.

TABLE VII

| | \multicolumn{6}{c}{Sample} |
| --- | --- | --- | --- | --- | --- | --- |
| | 13 | 14 | 15 | 16 | 17 | 18 |
| EPDM I | 100 | 100 | — | — | — | — |
| EPDM II | — | — | 100 | 100 | — | — |
| EPDM III | — | — | — | — | 100 | 100 |
| Clay | 5 | 5 | 5 | 5 | 5 | 5 |
| ZnO | 2 | 2 | 2 | 2 | 2 | 2 |
| Stannous Chloride | 1.26 | 1.26 | 1.26 | 1.26 | 1.26 | 1.26 |
| Polypropylene | 219.2 | 219.2 | 219.2 | 219.2 | 219.2 | 219.2 |
| Carbon Black | 19.28 | 19.28 | 19.28 | 19.28 | 19.28 | 19.28 |
| Phenolic Resin | 7 | 7 | 7 | 7 | 7 | 7 |
| Aliphatic Ester Plasticizer | 107 | 107 | 107 | 107 | 107 | 107 |
| Total | 460.74 | 460.74 | 460.74 | 460.74 | 460.74 | 460.74 |

TABLE VIII

| | \multicolumn{6}{c}{Sample} |
| --- | --- | --- | --- | --- | --- | --- |
| | 13 | 14 | 15 | 16 | 17 | 18 |
| Moisture (%) | 0.032 | 0.029 | 0.038 | 0.029 | 0.025 | 0.037 |
| Shore D Hardness | 38 | 38 | 38 | 38 | 38 | 39 |
| Specific Gravity | 0.909 | 0.906 | 0.909 | 0.909 | 0.906 | 0.907 |
| Ultimate Tensile Strength (MPa) | 19.26 | 17.45 | 18.40 | 17.94 | 18.06 | 20.13 |
| Ultimate Elongation (%) | 591 | 626 | 624 | 550 | 565 | 601 |
| Modulus at 100% (MPa) | 8.41 | 8.21 | 8.01 | 8.52 | 8.18 | 8.15 |
| % Wt. Gain (24 h @ 125° C.) | 50 | 60 | 61 | 48 | 53 | 52 |
| ACR (Poise) | 1543 | 2571 | 2887 | 2605 | 2624 | 2706 |
| Extrusion Surface Rating | 56 | 58 | 282 | 53 | 72 | 85 |
| Tension Set @ 23° C. (%) | 41.5 | 40 | 40.5 | 39 | 37.5 | 37 |
| Notched Izod @ −40° C. J/m | 690 ± 29 | 845 ± 12 | 823 ± 21 | 668 ± 47 | 745 ± 26 | 761 ± 26 |
| Compression Set, 25% Strain @ 70° C. | 59 | 58 | 54 | 49 | 58 | 55 |
| Compression Set, 25% Strain @ 100° C. | 60 | 55 | 56 | 57 | 56 | 55 |

Samples 19–24

In a similar fashion to Samples 1–18, additional thermoplastic vulcanizates were prepared and designated Samples 19–24. The recipes for each sample are provided in Table IX, and the results of testing are provided in Table X.

TABLE IX

| | \multicolumn{6}{c}{Sample} |
| --- | --- | --- | --- | --- | --- | --- |
| | 19 | 20 | 21 | 22 | 23 | 24 |
| EPDM I | 100 | 100 | 100 | — | — | — |
| EPDM IV | — | — | — | 100 | 100 | — |
| EPDM V | — | — | — | — | — | 115 |
| Clay | 10 | 10 | 10 | 10 | 10 | 10 |
| Powder Blend | 3.26 | 3.26 | 3.26 | 3.26 | 3.26 | 3.26 |
| Phenolic Resin | 6 | 6 | 6 | 6 | 6 | 6 |
| Polypropylene | 50 | 50 | 50 | 50 | 50 | 50 |
| Ester Plasticizer | 130 | 115 | 105 | 130 | 115 | 115 |
| Processing Oil | — | 15 | 25 | — | 15 | — |

TABLE X

| | Sample | | | | | |
|---|---|---|---|---|---|---|
| | 19 | 20 | 21 | 22 | 23 | 24 |
| Shore A Hardness | 63 | 64 | 64 | 64 | 63 | 64 |
| Specific Gravity | 0.912 | 0.912 | 0.909 | 0.911 | 0.91 | 0.907 |
| Ultimate Tensile Strength (psi) | 658 | 665 | 671 | 626 | 568 | 734 |
| Elongation at break (%) | 304 | 306 | 299 | 312 | 280 | 305 |
| Modulus at 100%, (psi) | 356 | 364 | 374 | 318 | 315 | 350 |
| % Wt Gain | 124 | 126 | 119 | 124 | 120 | 101 |
| Viscosity ACR (Poise) | 192 | 225 | 250 | 285 | 200 | 281 |
| Extrusion Surface Rating | 203 | 232 | 288 | 319 | 256 | 239 |
| Tension Set @ 23° C. (%) | 17.5 | 15 | 14 | 15 | 13 | 12 |
| Compression Recovery, 50% Strain @ −29° C. | 77 | 78 | 76 | 82 | 81 | 85 |

Samples 25–28

In a similar fashion to Samples 1–24, additional thermoplastic vulcanizates were prepared and designated Samples 25–28, except that large-scale high shear mixers were employed as set forth in U.S. Pat. No. 4,594,390. The recipes for each sample are provided in Table XI, and the results of testing are provided in Table XII.

TABLE XI

| | Sample | | | |
|---|---|---|---|---|
| | 25 | 26 | 27 | 28 |
| EPDM I | 100 | — | 100 | — |
| EPDM III | — | 100 | — | 100 |
| Clay | 42 | 42 | 42 | 42 |
| Wax | 3.4 | 3.4 | 3.4 | 3.4 |
| Zinc Oxide | 1.94 | 1.94 | 1.94 | 1.94 |
| Stannous Chloride | 1.26 | 1.26 | 1.26 | 1.26 |
| Polypropylene | 36.9 | 36.9 | 36.9 | 36.9 |
| Carbon Black | 24.4 | 24.4 | 24.4 | 24.4 |
| Phenolic Resin | 4.4 | 4.4 | 4.4 | 4.4 |
| Processing Oil | 135 | 135 | — | — |
| Ester Plasticizer | — | — | 135 | 135 |

TABLE XII

| | Sample | | | |
|---|---|---|---|---|
| | 25 | 26 | 27 | 28 |
| Moisture (%) | 0.029 | 0.02 | 0.022 | 0.031 |
| Shore A Hardness | 67.1 | 66.7 | 65 | 63.9 |
| Specific Gravity | 0.966 | 0.979 | 0.981 | 0.976 |
| Ultimate Tensile Strength (psi) | 1002 | 986 | 871 | 832 |
| Elongation at break (%) | 315 | 308 | 327 | 310 |
| Modulus at 100%, (psi) | 407 | 398 | 350 | 325 |
| % Wt Gain | 78 | 74 | 86 | 85 |
| Viscosity ACR (Poise) | 628 | 498 | 321 | 328 |
| Extrusion Surface Rating | 165 | 169 | 150 | 123 |
| Tension Set @ 23° C. (%) (compression molded plaques) | 6 | 5.5 | 6.5 | 5.5 |
| Compression Recovery, 1 hr recovery @ −29° C., 50% Compression @ −29° C. and 24 hrs. (compression molded buttons) | 63 | 77 | 74 | 86 |
| Compression Set, 25% Compression @ 70° C. and 24 hrs. (compression molded buttons) | 25 | 20 | 25 | 23 |

While the best mode and preferred embodiment of the invention have been set forth in accord with the Patent Statues, the scope of this invention is not limited thereto, but rather is defined by the attached claims. Thus, the scope of the invention includes all modifications and variations that may fall within the scope of the claims.

What is claimed is:

1. A thermoplastic vulcanizate comprising a blend of cured rubber, said cured having a degree of cure where not more than 5 percent of said cured rubber is extractable in boiling xylene or cyclohexane and thermoplastic resin, where said rubber comprises an elastomeric copolymer of ethylene, at least one α-olefin, and optionally one or more diene monomers, where said elastomeric copolymer is characterized by having a crystallinity, as measured by differential scanning calorimetry, of less than 3 J/g, an ethylene content that is less than 70 mole percent based upon the entire copolymer, a weight average molecular weight that is greater than about 40,000 as measured by GPC with polystyrene standards, a molecular weight distribution that is less than 7, and an ethylene compositional distribution that is less than about 4 percent for the closest 90 percent of fractioned samples.

2. The thermoplastic vulcanizate of claim 1, where said blend further comprises an extender oil including a petroleum processing oil, a synthetic oil, a plasticizer, an organic ester, an alkyl ether ester, or combinations of two or more thereof.

3. The thermoplastic vulcanizate of claim 1, where said elastomeric copolymer is a terpolymer/tetrapolymer of ethylene, propylene, and 5-ethylidene-2-norbornene and/or 5-vinyl-2-norbornene, and where said thermoplastic resin comprises polypropylene.

4. The thermoplastic vulcanizate of claim 1, said elastomeric copolymer is characterized by having a Mooney viscosity ($ML_{1+4}$ @ 125° C.) of from about 50 to about 150, and an ethylene compositional distribution that is less than about 3 percent for the closest 90 percent of fractioned samples.

5. The thermoplastic vulcanizate of claim 4, where said elastomeric copolymer is characterized by having a crystallinity of less than 0.2 J/g, an ethylene content that is less than 60 mole percent based upon the entire copolymer, a weight average molecular weight that is greater than about 100,000, and an ethylene compositional distribution that is less than about 2 percent for the closest 90 percent of fractioned samples.

6. The thermoplastic vulcanizate of claim 5, where said elastomeric copolymer is characterized by having a crystallinity of less than 0.1 J/g, an ethylene content that is less than 50 mole percent based upon the entire copolymer, a weight average molecular weight that is greater than about 250,000, a Mooney viscosity ($ML_{1+4}$ @ 125° C.) of from greater than 80 to about 90, and an ethylene compositional distribution that is less than about 1 percent for the closest 90 percent of fractioned samples.

7. The thermoplastic vulcanizate of claim 6, where said elastomeric copolymer has a Mooney viscosity ($ML_{1+4}$ @ 125° C.) of about 70 to about 100.

8. The thermoplastic vulcanizate of claim 1, where said blend comprises from about 45 to about 85 percent by weight said cured rubber and from about 15 to about 55 percent by weight thermoplastic resin, based upon the total weight of said cured rubber and said thermoplastic resin combined.

9. A thermoplastic vulcanizate comprising: a blend of cured rubber, and thermoplastic resin, where said rubber comprises an elastomeric copolymer of ethylene, at least one α-olefin, and optionally one or more diene monomers, where said elastomeric copolymer is characterized by having a crystallinity, as measured by differential scanning calorimetry, of less than 3 J/g, an ethylene content that is less than 60 mole percent based upon the entire copolymer, a Mooney viscosity ($ML_{1+4}$ @ 125° C.) of about 70 to about 100, a molecular weight distribution that is less than 5, and an ethylene compositional distribution that is less than about 4 percent for the closest 90 percent of fractioned samples.

10. The thermoplastic resin of claim 9, where said cured rubber has a degree of cure where not more that 5 percent of said cured rubber is extractable in boiling xylene or cyclohexane.

11. The thermoplastic vulcanizate of claim 10, where said blend further comprises an extender oil including a petroleum processing oil, a synthetic oil, a plasticizer, an organic ester, an alkyl ether ester, or a combination of two or more thereof.

12. The thermoplastic vulcanizate of claim 11, where said elastomeric copolymer is a terpolymer/tetrapolymer of ethylene, propylene, and 5-ethylidene-2-norbornene and/or 5-vinyl-2-norbornene, and where said thermoplastic resin comprises polypropylene.

13. The thermoplastic vulcanizate of claim 12, where said blend comprises from about 45 to about 85 percent by weight said cured rubber and from about 15 to about 55 percent by weight thermoplastic resin, based upon the total weight of said cured rubber and said thermoplastic resin combined.

* * * * *